United States Patent [19]

Doggett

[11] Patent Number: 4,478,480
[45] Date of Patent: Oct. 23, 1984

[54] HOLOGRAPHIC SCANNER SPINNER WOBBLE CORRECTION SYSTEM

[75] Inventor: David E. Doggett, Cupertino, Calif.

[73] Assignee: Benson, Inc., Mountain View, Calif.

[21] Appl. No.: 453,362

[22] Filed: Dec. 27, 1982

[51] Int. Cl.³ .............................................. G02B 27/17
[52] U.S. Cl. ..................................... 350/3.71; 350/6.7
[58] Field of Search ................................ 350/3.71, 6.7

[56] References Cited

U.S. PATENT DOCUMENTS

| | | | |
|---|---|---|---|
| 3,897,132 | 7/1975 | Meeussen et al. | 350/6.7 |
| 4,067,639 | 1/1978 | Kramer | 350/6.9 |
| 4,094,576 | 6/1978 | Heiling | 350/3.71 |
| 4,239,326 | 12/1980 | Kramer | 350/3.71 |
| 4,243,293 | 1/1981 | Kramer | 350/3.71 |
| 4,289,371 | 9/1981 | Kramer | 350/3.71 |
| 4,304,459 | 12/1981 | Kramer | 350/3.71 |

Primary Examiner—Bruce Y. Arnold

[57] ABSTRACT

An optical laser scanning system includes a hologram spinner disc (32) having diffraction grating facets (33) around its periphery. The spinner is susceptible to wobble and translational movement of the facets with respect to a plane perpendicular to the disc axis (35). Corrective means (37) in the form of a ray converging element (37) are provided to collect parallel diffracted rays from the facets in translated positions of wobble and converge such rays to a spacial spot scan (38) on an imaging surface (40). By orienting the spinner such that the diffracted light beam makes a 90° angle with the incident light beam and then providing a parabolic cylinder to direct and focus the diffracted light beam on the imaging surface, the effects of both translational and angular wobble on the image formed are eliminated.

5 Claims, 6 Drawing Figures

HOLOGRAPHIC SCANNER SPINNER WOBBLE CORRECTION SYSTEM

BACKGROUND OF THE INVENTION

This invention relates to laser light scanning using a holographic diffraction disc (also called a "spinner" or "scanner"). Specifically it provides for a means to correct for the effect of the displacement of the diffracted laser beam caused by "wobble" of a tilted holographic spinner disc. "Wobble" is a phenomenon resulting from misalignment between the spinner disc and its axis of rotation such that a normal to the plane of the disc forms a small angle with the axis of rotation of the disc. The invention finds utility in a scanning system using a laser beam for the writing of information on a photoconductive or other writing surface.

DESCRIPTION OF THE PRIOR ART

U.S. Pat. No. 4,067,639 (Kramer) discloses the use of a flexible mounting for the central shaft of a holographic spinner to minimize spot wobble. Thus instead of expensively manufacturing a rigidly mounted spinner, (i.e., providing gratings of precise mechanical and optical tolerances) an elastically deformable member is provided to physically minimize the amount of wobble. U.S. Pat. No. 4,239,326 (Kramer) presents a system in which the spinner disc is tilted with respect to a laser light beam. Kramer discloses that such an orientation, preferably where the tilt angle $\theta/2$ is 45° and the beam is diffracted at an angle of 90° to the incident beam results in no angular variation of the diffracted beam and allegedly provides insensitivity to any mechanical wobble of the spinner. While it is true that the angle of the diffracted beam in the Kramer '326 device is insensitive to mechanical wobble of the disc, the problem of displacement of the diffracted beam is not addressed or even mentioned. A third Kramer U.S. Pat. No. 4,243,293 is directed to a further attempt to make a scanner possessing unequal angles of incidence and diffraction insensitive to mechanical wobble during rotation. This is done by providing a spherical mirror having an axis perpendicular to the spinner axis and a center of curvature on the spinner axis, with a particular spacing of the holographic facets and mirror axis. While Kramer '293 recognizes that mechanical wobble caused by displacement of the scanning disc causes certain undesirable results, his solution uses a combination of cylindrical and spherical optics after the scanning disc. These optics add expense.

A fourth Kramer U.S. Pat. No. 4,289,371 discloses in column 10 lines 22 to 34 that when the angle of incidence $\theta_i$ of the laser beam onto the holographic disc equals the angle of diffraction $\theta_d$ of the laser beam leaving the holographic disc and in particular when in the preferred mode these two angles are 45°, the system is invariant to wobble. However, by wobble, it is apparent that Kramer is referring solely to the effect of the angular variation of the holographic disc with respect to the incident laser beam and its effect upon the angle made by the diffracted beam with respect to the incident beam. It is clear from Kramer's description that the words "invariant to wobble" are used to mean that the angle of the diffracted beam to the incident beam remains "invariant" for small angular changes of the holographic disc which change the angle of incidence of the laser beam relative to the holographic disc. What Kramer does not mention is that "wobble" of the holographic disc also displaces or translates the point in space at which the incident beam intersects the holographic disc and therefore laterally translates the point of origin of the diffracted beam. The diffracted beam therefore occupies a position in space parallel to the position in space which it would occupy if there had been no wobble of the disc. Kramer does not describe this effect and thus provides no means for correcting this effect. Hereinafter, the effect of wobble on the diffracted beam will be broken down into two components: "angular wobble" which produces a variation in the angle of the diffracted beam relative to the incident beam as a result of angular change of the holographic disc from its intended position, and "translational wobble" which produces a displacement of the diffracted beam from its normal position in the absence of wobble as a result of the translation of the point of intersection of the incident beam with the holographic disc due to the angular misalignment of the plane of the holographic disc from its intended plane perpendicular to the axis of rotation.

A hologram scanning disc can be configured to produce a straight line scan (that is, a scan line by the diffracted beam which is straight and has no "bow") by tilting the disc so that the diffracted beam makes an angle of ninety degrees (90°) with the incident beam. When the scanning disc is subject to mechanical wobble, the effect of "angular wobble" can be minimized by making the angle between the incident beam and the disc substantially equal to the angle between the diffracted beam and the disc. When the angle made by the diffracted beam with the incident beam is ninety degrees (90°), the angle between the incident beam and the disc and also between the diffracted beam and the disc is forty-five degrees (45°). However, this does not correct for what I have termed "translational wobble".

SUMMARY OF THE INVENTION

In accordance with this invention, the effect of "translational wobble" is corrected in a straight line scanning system by using a parabolic cylinder to direct and focus the translationally displaced diffracted beam to that straight line on the photoconductive surface to which the diffracted beam would have been directed in the absence of translational wobble.

It is to be recognized that the peripheral edge of a wobbling disc translates in a direction parallel to the rotational axis of the disc. The point of origin of the diffracted beam (which is related to the point of intersection of the incident beam with the disc) translates laterally in a direction paralled to the rotational axis of the disc as the disc rotates when the disc is mounted in a plane angularly displaced from its intended plane. Significant image degradation may result from a translational wobble as small as or even smaller than 0.001 inch on a three inch diameter disc. As is well known in the art, a large number of holographic facets (gratings) are provided on a disc resulting in many raster scans per revolution of the disc. In a wobbling disc the frequency of translational wobble is the same as the frequency of disc rotation. The effect of wobble is shown in FIGS. 5a and 5b. FIG. 5a shows the first dot generated in each of the scan lines formed during one rotation of the disc 10 as shown in FIG. 1 while the photoconductive surface is moving relatively slowly perpendicular to the direction of the scan. It should be understood that the disc 10 contains twelve (12) facets, each facet comprising a diffraction grating, which defract the light beam. Thus one rotation of the disc results in twelve scans across the photoconductive surface on which information is being recorded. During each scan, the laser beam is modulated in response to the information to be printed as controlled by data from a data source such as a computer memory. Generally, the beam is modulated either "on" or "off" so that each data point on the photoconductive surface will either detect the presence of the laser beam or the absence of the laser beam. Each of the twelve dots labeled 101 through 112 represent the initial dot at the start of each of the 12 scan lines generated during the passage of a corresponding facet on disc 10 past the incident light beam 11. It should be understood that for the purpose of illustration each scan line can be thought of as a plurality of dots generated as the beam travels horizontally across the photoconductive surface. For simplicity, the plurality of dots in each scan line are omitted in FIG. 5a because the effect of translational wobble can be illustrated merely by looking at one vertical sequence of dots from the same point on a plurality of sequential scan lines.

In a normal system using a photoconductive surface on which information is recorded by a laser beam of the type employing the assembly of this invention, the photoconductive surface is moving in a direction substantially perpendicular to the scan direction (but at a much slower speed) such that the lines formed by one scan on the photoconductive surface are only approximately horizontal. The energy deposited at any point on the photoconductive surface is a function of the relative speeds of motion of the photoconductive surface and the laser beam and the energy in the laser beam. In actual practice the appearance of the scan line will depend on the information being displayed on the photoconductive surface. If there is a displacement of the diffracted laser beam due to translational wobble, then the energy incident on the photoconductive surface can bunch or be rarefacted such that the image generated on the photoconductive surface appears darker in places than intended and lighter in other places than intended. The visual effect of the "bunching" of scan origin points 101 through 104 is shown by the dark blot labeled 120 in FIG. 5b. The rarefaction between scan points or dots 105, 106, 107 and 108 appears as a light spot 121 on a vertical line on the photoconductive surface of FIG. 5b while the bunching of dots 109 through 112 again appears as a dark area 122 as shown in FIG. 5b. This translational wobble distorts the image. It is this phenomenon that is corrected in accordance with this invention.

In accordance with this invention a corrective element is provided between the rotating disc or spinner and the photoconductive surface to direct and focus the translationally displaced diffracted beam caused by translational wobble of the disc onto the photoreceptor or photoconductive surface on which information is to be recorded. In one embodiment, this correctional element comprises a parabolic cylinder which directs and focuses the diffracted beam onto the photoconductor surface. In one further embodiment, the parabolic cylinder can be replaced by a circular cylinder provided the portion of the parabola being replaced can be approximated with sufficient accuracy by a circular cylinder.

In accordance with this invention, translational wobble is corrected only for the embodiment which has previously been configured to yield straight line scanning. The constraints of bow correction are such that a system which produces a curved scan line corrected, for example, in accordance with the disclosure of copending application Ser. No. 06/237,833 filed February 1981 on an invention of Stramondo et al. and assigned to Benson, Inc. the assignee of this application, in general cannot be used together with the structure of this invention. Thus my invention is applicable to a system which has previously been configured to yield a straight line scan without a bow correcting element.

This invention will be more fully understood in conjunction with the following detailed description taken together with the attached drawings.

DETAILED DESCRIPTION OF DRAWINGS

Figure 1:
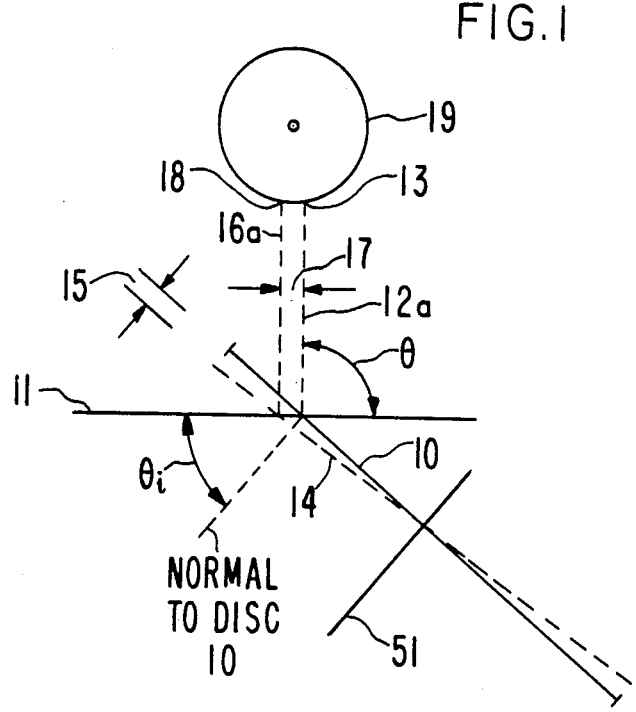
FIG. 1 is a geometric illustration of a scanning system in which wobble of a holographic spinner causes non-collinear raster scan lines on an imaging surface.

FIG. 1 shows a holographic disc (also called a "spinner") 10 which rotates about a central axis 51. Spinner 10 is a transmission-type hologram of a well-known design containing a plurality of diffraction gratings formed in facets and is disposed at an angle, as illustrated in U.S. Pat. No. 4,239,326 and on pages 1338 and 1339 of the Mar. 12, 1982 issue of Science, Volume 215, to a laser or coherent light beam ray 11. These facets diffract the ray 11 into a path 12a at an angle $\theta$ from the direction of ray 11. Angle $\theta_i$ is one-half the angle $\theta$. By providing such an angular relationship, the angle of the diffracted beam 12a does not change due to spinner angular wobble, as is known in the art. However, as a spinner translationally wobbles, the point of origin of the diffracted beam does translate laterally as shown by the exaggerated displacement distance 15 between spinner 10 in its normal non-wobble position and the spinner in dashed lines 14 in translational wobble position. Thus in the presence of translational wobble diffracted beam 12a will translate by the distance 17 to position 16a.

In accordance with my invention the diffracted beam 12a makes an angle of ninety degrees (90°) with the incident beam 11. Lateral displacement of the point of incidence of beam 11 with disc 10 is in a direction parallel to the spin axis 51 of the spinner 10. The result of this displacement 15 is that displaced diffracted ray 16a, which has the same angularity $\theta$ with respect to incident light ray 11, has a position of intercept with surface 19 displaced by the distance 15 divided by $\cos \theta_i$ from the position of intercept by ray 12a with such element.

Non-wobble ray 12a is directed to the desired position 13 on the imaging or writing surface 19. Surface 19 may be a xerographic plate or other photosensitive surface which normally moves in a direction perpendicular to the direction of scan by the light spot generated by the ray 12b to effect raster scanning over the two-dimensional surface. Due to translational wobble displacement, however, ray 16a is directed to and acts on a spot on surface 19 at a displaced position 18. This displacement results in a reproduced image of varying light and dark areas.

Figure 2:
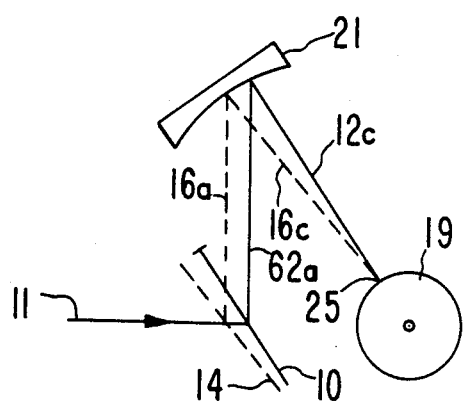
FIG. 2 is a geometric illustration of the system of FIG. 1 as corrected for translational wobble to provide for collinear scan lines on the imaging surface.

FIG. 2 illustrates the correction provided for the above-described ray and spot displacement. A corrective element, for example, an off-axis parabolic cylinder 21 (which can be approximated by a circular cylinder), is provided between the spinner 10 and the imaging surface 19 which directs and focuses the parallel non-wobble ray 12a and the translational wobble ray 16a into converging rays 12c and 16c which intersect at a point 25 on imaging surface 19. This correction results in linear scan images of uniform quality. The present system and method of focussing the displaced wobble ray has application to a straight line scan system and is inapplicable to a curved scan.

FIG. 2 illustrates a solution to the problem of translational wobble in the scanner disc 10 in terms of reflective optics. The scanner disc 10 is shown at a 45° tilt from the incident ray 11. The facets on the spinner 10 diffract the rays in both non-wobble (solid line) and translational wobble (dotted line) positions at a 45° angle with respect to the disc surface to a circular cylindrical mirror 21 which convergingly reflect the beam rays to a single spot on imaging surface 19. This 90° configuration removes all "bow" from the scan line and with circular cylinder 21 corrects for any distortion of the scanning image on the imaging surface due to translational wobble.

Figure 3:
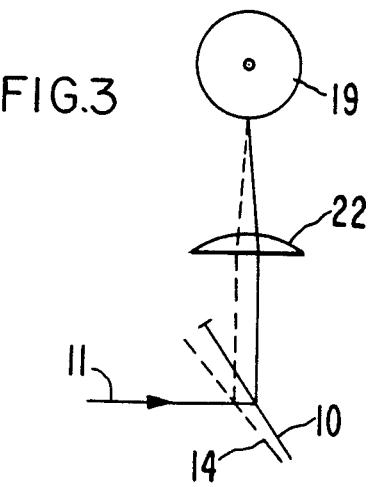
FIG. 3 is a geometric illustration of a second embodiment of my invention.

FIG. 3 illustrates a further embodiment of the invention wherein the incident beam ray 11 is at a 45° tilt with the spinner and is diffracted by the spinner 10 at a 45° incident angle in both the non-wobble position and wobble position to a cylindrical converging lens 22 which focuses the diffracted rays to a single point on imaging surface 19.

Figure 4:
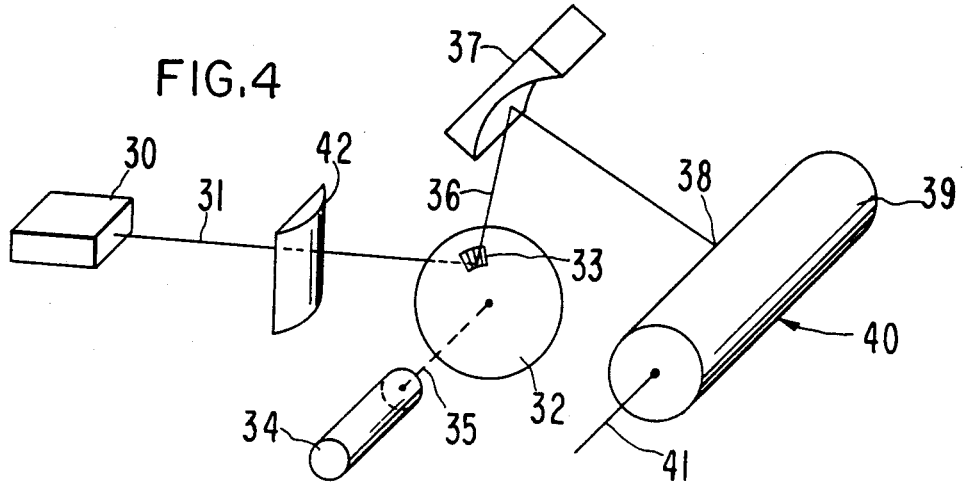
FIG. 4 is a schematic illustration of the system of FIG. 2.
Figures 5A, 5B:
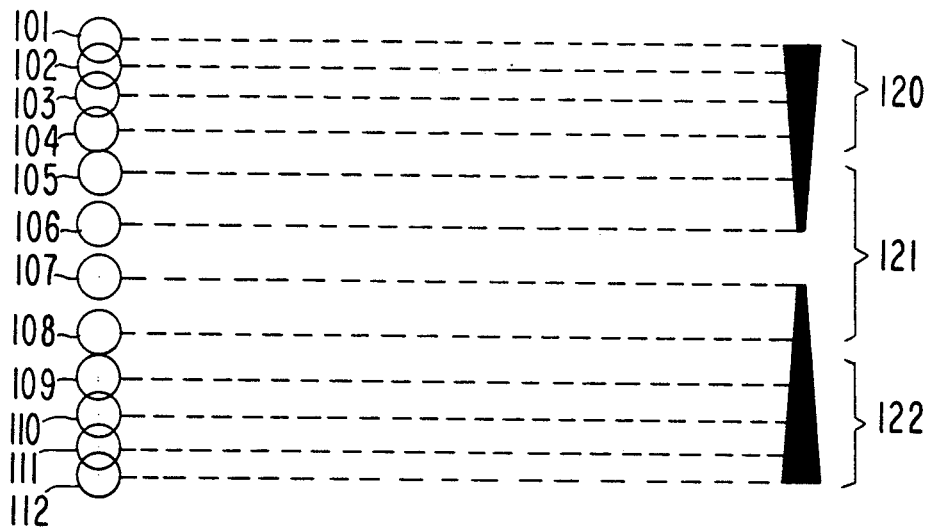
FIGS. 5a and 5b illustrate the effect of translational wobble on a vertical line formed during one rotation of the holographic disc 10 of FIG. 1.

FIG. 4 schematically shows an operating system including a source 30 of laser or other coherent light 31. The system is sensitive to laser mode hopping and therefore it is preferred to use a single mode laser or a laser whose modes are sufficiently close. A helium-neon laser 40 may be employed. A gallium-arsenide laser, suitably controlled to prevent mode hopping, may also be used. A holographic spinner 32 having a series of facets (diffraction gratings) 33 (twelve in one embodiment) around its periphery is driven by a motor 34 with shaft 35. As discussed above, spinner 32 is tilted at 45° with respect to beam 31. Beam 31 is passed through cylindrical lens 42 which focuses beam 31 in one dimension orthogonal to the focusing of corrective element 37. Due to translational wobble the facets at various positions around each revolution of travel are physically offset or displaced from a plane aboslutely normal to the spin axis 35 of the disc 32 at its point of attachment to the shaft. The diffracted rays 36 are reflected by a parabolic cylinder or other approximation of a parabolic cylindrical surface 37 which directs and focuses the rays to a point 38 at an imaging surface 39. Of course, element 37 could be a cylindrical converging lens, if desired. Element 37 focuses rays 36 in a direction orthogonal to the focusing effect of cylindrical lens 42. Motion of the spinner 32 results in the light point 38 scanning the surface 39 of a cylindrical photoconductive drum 40 rotating on an axis 41 to effect raster scanning and printing of multiple scan lines. A suitable moving photoconductive belt or other surface may be employed in place of a drum 40.

While the present invention has been described by reference to what is believed to be the most practical embodiment, it is understood that the invention may embody other specific forms not departing from the spirit of the invention. It is understood that there are other embodiments which possess the quantities and characteristics which would generally function in the same manner and should be considered within the scope of this invention. The present embodiment should be considered in all respects as illustrative only with the scope of the invention being limited solely by the appended claims rather than the foregoing description and with equivalents to the structure claimed being intended to be embraced therein.

I claim:

1. In an optical scanning system including a source of a monochromatic collimated light beam and a transmission-type hologram spinner having formed thereon a series of plane holographic linear diffraction grating facets, said spinner being placed to diffract said light beam, said spinner being subject to a degree of translational wobble, the improvement comprising means for focusing said light beam in one direction;

means mounting said spinner on its axis of rotation such that the angle made by the diffracted light beam with the incident light beam is 90°, and the angle of diffraction is approximately equal to the angle of incidence, said diffracted beam being displaced to a path parallel to the path it would occupy in the absence of translational wobble;

corrective means for directing and focusing said diffracted light beam in a direction perpendicular to said one direction; to a position on a moving scan surface which it would occupy in the absence of translational wobble.

2. The invention as set forth in claim 1 in which said moving scan surface is a photosensitive surface on a revolving drum.

3. The invention as set forth in claim 1 in which said corrective means is a cylindrical parabolic mirror.

4. The invention as set forth in claim 1 in which said corrective means is a cylindrical circular mirror.

5. The invention as set forth in claim 1 in which said corrective means is a cylindrical converging lens.

* * * * *